April 29, 1924.
S. RAWLINSON
STUB AXLE CONNECTION FOR VEHICLE WHEELS
Filed Oct. 23, 1920  2 Sheets-Sheet 2
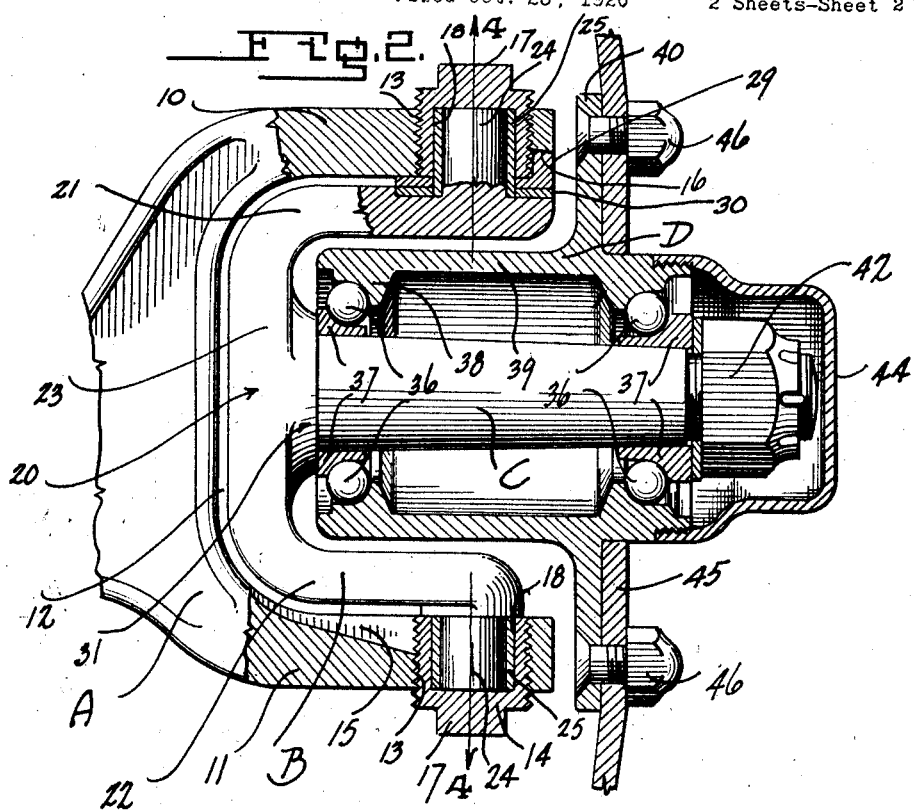
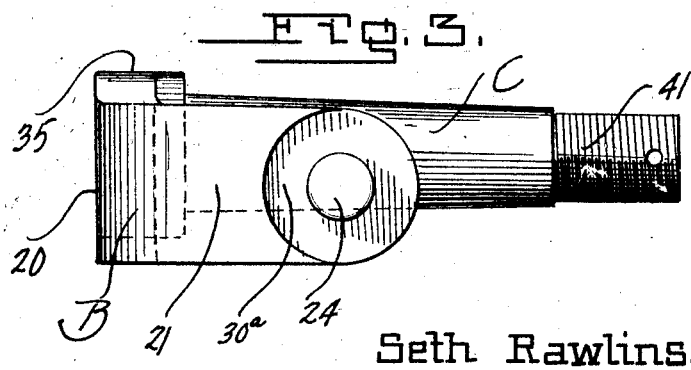
Seth Rawlinson
Inventor Patented Apr. 29, 1924.

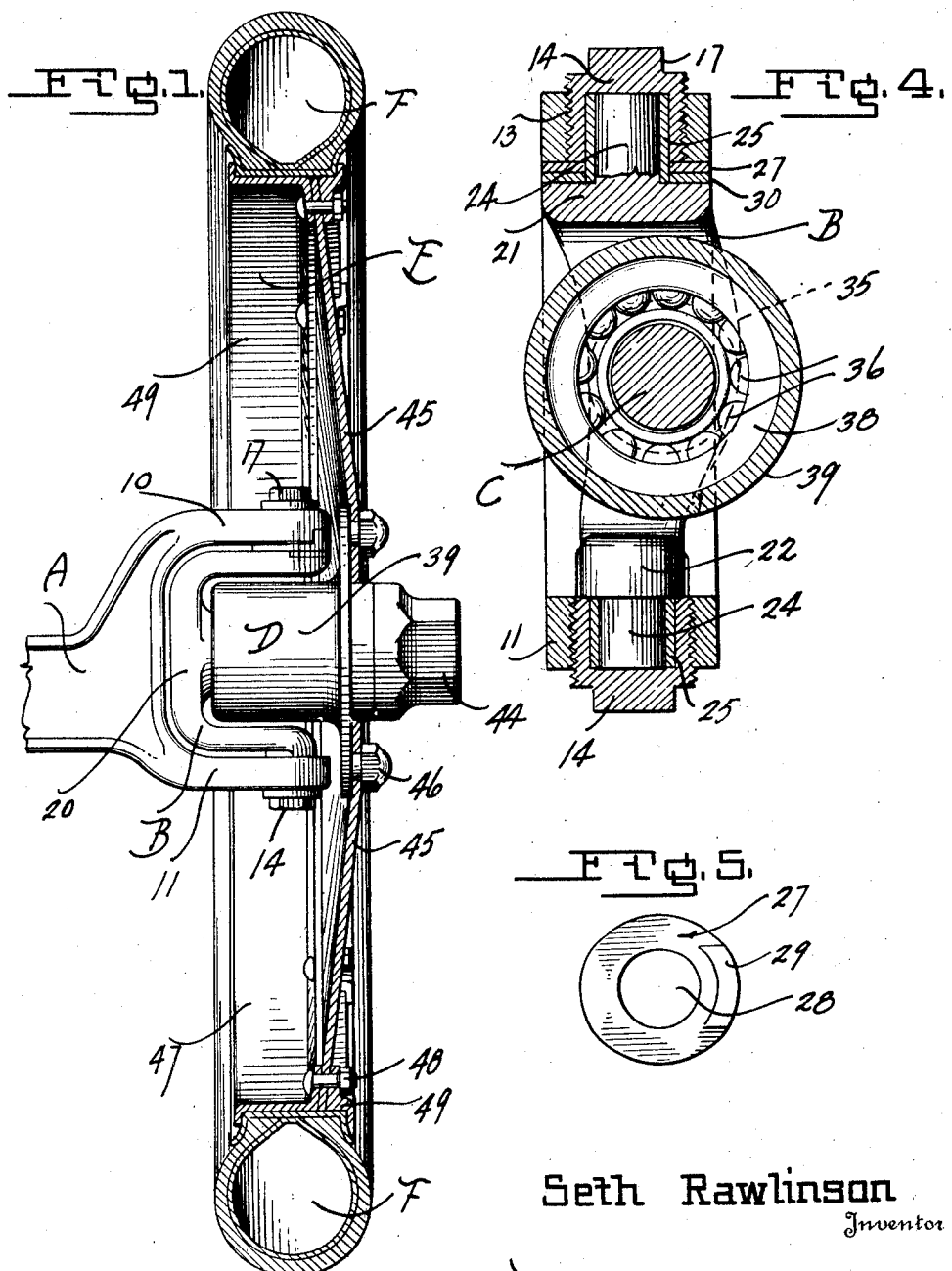

1,492,265

UNITED STATES PATENT OFFICE.

SETH RAWLINSON, OF SPANAWAY, WASHINGTON.

STUB-AXLE CONNECTION FOR VEHICLE WHEELS.

Application filed October 23, 1920. Serial No. 418,978.

*To all whom it may concern:*

Be it known that I, SETH RAWLINSON, a citizen of the United States, residing at Spanaway, in the county of Pierce and State of Washington, have invented certain new and useful Improvements in Stub-Axle Connections for Vehicle Wheels, of which the following is a specification.

This invention relates to improvements in steering devices for vehicle wheels.

An important object of the invention is the provision of a wheel stub axle connection, in which the wheel is so stabilized as to easily receive strains incident to vibration and loads.

A further object of the invention is the provision of a vehicle wheel stub axle connection in which the plane of the steering wheels lies substantially in a position at right angles to the center line of the wheel bearing.

A further object of the invention is the provision of a device of the above described character having steering knuckles embodying wheel spindles and which wheels have parts thereupon, to be mounted upon the spindles, the wheels having a bearing surface upon each side of the steering knuckle pivot.

A further object of the invention is the provision of a vehicle wheel stub axle connection embodying a steering knuckle of the above described character, which can be easily and securely mounted upon an axle yoke, to receive a vehicle wheel.

Other objects and advantages of the invention will be apparent during the course of the following detailed description.

In the accompanying drawings, forming a part of this specification, and in which like reference characters designate like parts throughout the same:

Figure 1 is a cross sectional view of a vehicle wheel having the improved stub axle connection attached thereto.

Figure 2 is a fragmentary cross sectional view of the improved stub axle connection.

Figure 3 is a plan view of the steering knuckle forming a part of this section.

Figure 4 is a cross section taken on the line 4—4 of Figure 2.

Figure 5 is a plan view of a detail of the improved stub axle connection.

In the drawings, wherein for the purpose of illustration is shown a preferred embodiment of my invention, the letter A designates a support which in the case of a motor vehicle would be the front axle, having the steering knuckle B pivotally mounted thereon, and upon which steering knuckle is a spindle C having a wheeled hub D rotatably disposed thereon. The wheeled hub D is preferably detachably connected to a disc wheel structure E, having a pneumatic tire F mounted thereon.

The axle A is preferably of the drop forge type and having the bifurcated ends, or steering knuckle yokes provided upon each end thereof. The yokes comprise an upper arm 10 and a lower arm 11, spaced to provide a recess 12 for the reception of the steering knuckle B. Each of the arms 10 and 11 are provided with screw threaded apertures therein near the forward ends thereof, for the reception of bearing nuts 14. The lower arm 11 is provided with a depression 15 extending rearwardly upon the arm 11 from the aperture 13; while the arm 10 is provided with a cut away portion 16 facing said depression 15, and upon the forward end of the arm 10, adjacent the screw threaded aperture 13 therein. The depresion 15 and cut away portion 16 are provided in the axle A for the purpose of facilitating the connection of the steering knuckle B thereto, the operation of which will hereinafter be more fully disclosed.

The bearing cap 14 comprises a wrench receiving portion 17, adapted to project from the faces of the arms 10 and 11, while each of the bearing caps are hollow to provide sockets 18 facing toward one another for the purpose of pivotally receiving the steering knuckle B.

The spindle C comprises a substantially U-shaped frame 20, comprising the legs 21 and 22, connected by the bight portion 23. Upon the forward end of each leg 21 and 22 a lateral projection 24, circular in cross section and outwardly extending from the legs is formed, which are provided for pivotal disposition within the sockets 18 of the bearing nuts 14. It is preferred, however, that some bearing material such as babbitt, or the like, preferably in the shape of a sleeve 25 be provided, intermediate the projection 24 and the interior surfaces of the socket 18 for the purpose of providing a better pivotal connection. However, ball bearings may be substituted to supplant the babbitt sleeve 25. In order to provide an anti-friction pivotal connection between the arm 21 and the leg 10 of the axle A, it will be necessary to dispose a filler within the cut-away portion 16. For this purpose the washer 27 has been provided, having an aperture 28 therein to circumferentially engage the sleeve 25 and having an upwardly extending projection 29 thereon, adapted for insertion into the cut away portion 16 to provide a filler for the same. A wear washer 30 is provided for insertion in a depression 30ª in the arm 21 adapted for disposition beneath the washer 27 to take the wear thereof incidental to pivotal movement of the steering knuckle B. The spindle C adapted to receive the wheel D is preferably provided integral with the steering knuckle B and upon the bight portion 23 thereof extending outwardly, parallel to and in the same direction as the legs 21 and 22 thereof. An annular shoulder 31 is provided circumferentially about the spindle C and its connection with the steering knuckle B. It is preferred that the knuckle B have a bearing surface lying upon each side of a center line drawn from one pivotal projection 25 to the other and having the center line of the spindle perpendicular to the center line of the steering knuckle pivot. The center of the pivotal connection of the knuckle B with the axle A is, however, offset in a forward direction from the center line of the steering knuckle spindle, thus providing some flexibility in the riding of the vehicle wheel. Suitable steering arms (not shown) may be positioned upon the bight portion 23 of the steering knuckle B and preferably upon the rear surface 35.

Any approved type of wheel hub D and wheel E can of course be mounted upon the spindle C. The wheel hub D illustrated in the drawings is preferably supported upon the spindle C by the anti-friction thrust bearings 36 which may be of either the ball or roller bearing type, being supported from the spindles by races 37, and having races 38 provided integral with the extending portion 39 of the hub structure D. The hub structure D is adapted for insertion into the depressed portion provided by the U-shaped steering knuckle B and over the spindle C thereof in such manner that it is provided with a bearing support upon each side of the pivotal connection of the steering knuckle B. The hub structure D is provided with a flanged extension 40 adapted to have the wheeled structure E connected thereto. The spindle C is provided with the screw threaded portion 41 upon a free end thereof, adapted to receive a lock nut 42, for maintaining the wheeled hub, and consequently the wheel E upon the spindle C. A dust cap 44 is provided for sealing entrance to the anti-friction bearings or access to the lock nut 42.

The wheeled structure E may of course be of different construction. However, it is preferred that the same be of the disc type, embodying a disc plate 45, securely bolted, to the flange 40 of the hub structure D by the bolts 46 and detachably connected to the rim 47 by bolts 48 and locking clips 49, the rim 47 having a tire F mounted thereon.

From Figure 1 of the drawings, it can be seen that the center line or center plane of the tire F and consequently of the wheel lies in a position to intersect the center line of the pivotal connection of the steering knuckle B. Thus many strains incident to riding of the wheel over rough roads or depositing heavy loads on the vehicle will be directed more evenly to the axle A and the strain at the point of connection of the spindle C with the steering knuckle B will not be so great.

In order to disconnect the steering knuckle construction, the wheel structure is first removed from the spindle B by removing the dust cap 44 and lock cap 42. The bearing caps 14 are then removed from their screw threaded apertures in the axle arms 10 and 11. The steering knuckle B will then drop in such position that the arm 22 thereof will be disposed within the depression 15 of the axle leg 11 and since the bearing nuts have been removed, the projection 29 upon the washer 27 will fall with the steering knuckle B and the pivot 24 of the upper arm 21, will fall out of the cut away portion 16, and the steering knuckle B easily removed from the connection of the yoke of the axle A. The operation of assemblying the device is of course opposite, or reverse to that of disconnection.

It is to be understood that the form of my invention herewith shown and described is to be taken as the preferred example of the same and that various changes in the shape, size and arrangement of parts may be resorted to without departing from the spirit of the invention or the scope of the subjoined claims.

I claim:

1. In a stub axle connection for vehicle wheels, the combination, of an axle having bifurcated ends, the legs of each of the bifurcated ends provided with apertures therein, a steering knuckle, bearing members disposed within said axle apertures for pivotally receiving said steering knuckle, said axle provided with depressed surfaces for permitting said steering knuckle to be removed from said axle upon removal of the bearing nuts from their respective apertures, a spindle, and a vehicle wheel rotatably mounted thereon.

2. In a stub axle connection for vehicles, the combination, of an axle having bifurcated ends to provide extending legs having a recess intermediate thereof, each of said legs provided with apertures, a steering knuckle substantially U-shaped in formation and having legs thereon, said knuckle legs having laterally and outwardly extending projections substantially circular in cross section, and a spindle positioned upon the bight portions of said U-shaped knuckle extending between and parallel with said legs of the knuckle, bearing members engaging in said apertures of the axle and having sockets therein for the reception of said steering knuckle projections for pivoting the steering knuckle to the axle, said axle legs having depressions therein to permit detachable connection of the steering knuckle thereto, and a vehicle wheel for detachably mounting upon the spindle of said steering knuckle.

SETH RAWLINSON.